UNITED STATES PATENT OFFICE.

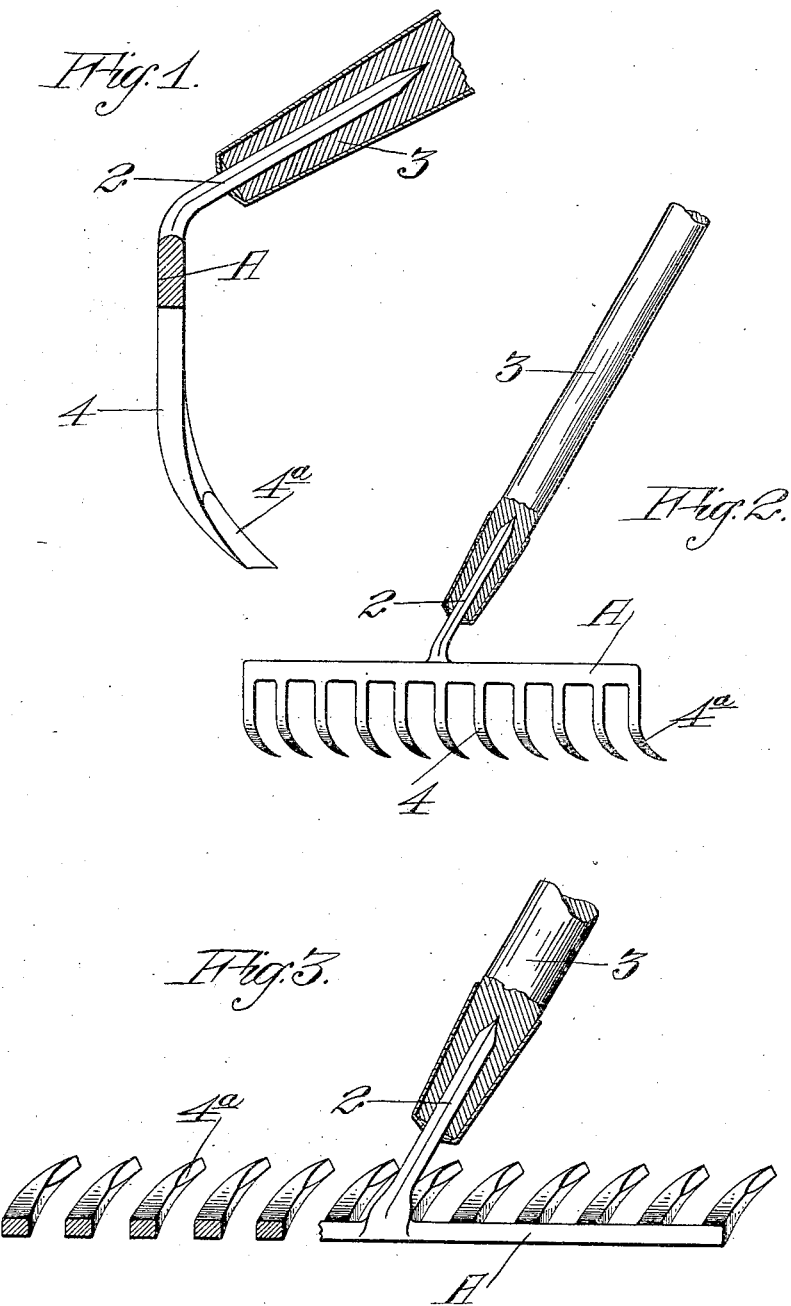

WILLIAM C. DOIDGE, OF LODI, CALIFORNIA.

GARDEN IMPLEMENT.

935,473.  Specification of Letters Patent.  Patented Sept. 28, 1909.

Application filed January 14, 1909. Serial No. 472,152.

*To all whom it may concern:*

Be it known that I, WILLIAM C. DOIDGE, a citizen of the United States, residing at Lodi, in the county of San Joaquin and State of California, have invented new and useful Improvements in Garden Implements, of which the following is a specification.

My invention relates to an implement for cultivating and loosening up the soil in gardens and the like.

It consists in a novel combination of teeth curved and angularly disposed with relation to the head in which they are carried, and a handle also diagonally disposed, and adjustable with relation to the head and teeth.

It also comprises details of construction which will be more fully explained by reference to the accompanying drawings, in which—

Figure 1 is a cross section through my garden implement. Fig. 2 is a front view of same partly in section, showing the angular relation between the handle and the rake body. Fig. 3 is a plan view partly in section, showing the angular relation between the handle and the rake body.

It is the object of my invention to provide an implement which is herein shown as being constructed to be operated by hand, and having teeth projecting from the head and curved in substantially parallel planes diagonal to said head, and said teeth having peculiarly formed cutting tips.

A handle is fixed diagonal to the head having its line in a plane parallel with the planes of the teeth, so that the implement may be used close to vines or shrubs, and the pull upon it being in a line with the handle, the movement of the teeth through the ground produces diagonal and approximately overlapping cuts which are very effective in loosening the soil and destroying weeds.

As shown in the drawing, A is the head which may be of any suitable or desired length, and it has a central shank 2 which is adapted to fit into the handle 3 by which the implement is operated. This shank is preferably made of malleable steel, and is capable of being bent so as to change its angle with the head. Its normal position is diagonal to the plane of the head as shown, and this angle may be readily changed to suit conditions by bending the yieldable shank 2.

The teeth 4 of the implement extend downward from the head A upon the opposite side from the shank 2. There may be as many of these teeth as found desirable. Preferably they are placed close enough together so that their combined action will include all of the soil within the space covered by the teeth.

The shanks of the teeth extend substantially straight from the head to a point about half of their length; they are then curved into arcs, and are also turned to one side, as shown more plainly at 4ª. The shanks of the teeth being substantially rectangular from the head to the point where the curvature commences, this curvature is on lines approximately diagonal from opposite angles of the shanks. These angles are then ground or finished off so that a sharp edged tip is produced. The planes of the tips of these teeth are substantially coincident with two opposite angles of the teeth shanks and at right angles with the corners which were cut away to produce the flattened tips, and these points or tips are diagonal to the line of the head. When in use, the implement is drawn through the ground in line with the handle, and parallel with the line of cultivation. This causes the diagonal edges to cut the soil with a slicing movement on account of the form of the tooth tips, and by reason of the diagonal position of the head with relation to the line of travel, the cuts made by the different teeth overlap each other, and act to cultivate the whole of the width through which they pass.

Tools of this description may be made with the teeth and handle standing in lines diagonal to the head, and either right or left handed to suit the characteristics of the user.

Having thus described my invention, what I claim and desire to secure by Letters Patent is—

1. An implement having a head with teeth extending from one side, said teeth having a primary straight portion below the head and an ultimate portion forming an extension of the straight portion and curved diagonally with the plane of the head, and a handle.

2. A garden implement having a head with teeth extending from one side, said teeth being substantially straight for substantially half their length, and having the ultimate portion curved diagonally to the plane of the head, and a handle projecting from the opposite side of the head in a line substantially parallel with the planes of curvature of the teeth.

3. In an implement of the character described, a head having teeth projecting from one side, said teeth having their lower portions flattened to form cutting edges, said lower portions being curved to one side so that they stand diagonally to the plane of the head, whereby the said cutting edges cut the soil with a slicing action when the implement is operated in line with the handle.

4. In an implement of the character described, a head having teeth projecting from one side, said teeth being straight for a portion of their length and having the tips curved in planes which are diagonal to the head, and the ends flattened and sharpened in planes transverse to the planes of curvature, and a handle projecting from the opposite side of the head, and in a line substantially parallel with the planes of curvature of the teeth.

5. In an implement of the character described, a head having teeth projecting from one side and curved in planes diagonal to said head, with tips sharpened transversely to the lines of curvature, a shank projecting from the opposite side of said head in a line parallel with the planes of curvature of the teeth, said shank being flexible whereby its angle with relation to the head is changeable.

In testimony whereof I have hereunto set my hand in presence of two subscribing witnesses.

WILLIAM C. DOIDGE.

Witnesses:
  GEO. H. STRONG,
  CHARLES A. PENFIELD.